United States Patent [19]

Stover

[11] 4,309,939

[45] Jan. 12, 1982

[54] BEVERAGE BREWING APPARATUS

[75] Inventor: Kenneth W. Stover, Springfield, Ill.

[73] Assignee: Bunn-O-Matic Corporation, Springfield, Ill.

[21] Appl. No.: 108,590

[22] Filed: Dec. 31, 1979

Related U.S. Application Data

[63] Continuation-in-part of Ser. No. 75,601, Sep. 14, 1979.

[51] Int. Cl.³ .................. A47J 31/40; A47J 31/56
[52] U.S. Cl. ........................... 99/280; 99/285; 99/295; 99/307
[58] Field of Search ............... 99/295, 302, 300, 304, 99/307, 316, 280, 281, 282, 283, 285, 279; 426/597

[56] References Cited

U.S. PATENT DOCUMENTS

| | | | |
|---|---|---|---|
| 2,485,246 | 10/1949 | Swanson | 99/283 |
| 2,890,643 | 6/1959 | King | 99/307 |
| 3,374,897 | 3/1968 | Martin | 99/295 |
| 3,408,921 | 11/1968 | Freese | 99/295 |
| 3,517,603 | 6/1970 | Bruenjes | 99/283 |
| 4,094,233 | 6/1978 | Martin | 99/305 |
| 4,174,006 | 11/1979 | Panneman | 141/87 |
| 4,207,809 | 6/1980 | Brill | 99/279 |

Primary Examiner—Robert W. Jenkins
Attorney, Agent, or Firm—Lockwood, Dewey, Alex & Cummings

[57] ABSTRACT

Fully automatic brewing apparatus is disclosed for economically and efficiently brewing large quantities of beverage. Beverage concentrate is first brewed from a dry, beverage-making material, such as granulated tea leaves contained in a rotatable funnel which may be pivoted for emptying the concentrate into selected one of a pair of large reservoirs. The concentrate is then automatically diluted to an acceptable strength and temperature by the timed addition of water to the reservoir in a stream which provides complete mixing of the concentrate with the diluting water.

56 Claims, 9 Drawing Figures

BEVERAGE BREWING APPARATUS

This is a continuation-in-part of co-pending application Ser. No. 075,601, filed Sept. 14, 1979.

The present invention relates generally to apparatus for making beverages, and, more particularly, to apparatus for brewing beverages such as tea, coffee and the like.

Equipment for brewing beverages such as coffee and the like have, heretofore, typically been of the "single station" type, in which an empty carafe or pot is positioned on a heating element below a receptacle or funnel which contains a measured quantity of dry beverage-making material, e.g., coffee grounds. Hot water is passed through the material to extract the essential oils, flavor and body that make up the beverage, and then drains downwardly through an opening in the funnel into the pot or carafe. If a second pot or carafe of beverage is needed, the first must be moved to a separate heating element or hot plate. Although such brewers work satisfactorily for making relatively small quantities of beverage, in restaurants and other commercial establishments, there is a continuing need for equipment to make large quantities of beverages, which is easy to use and relatively automatic so as not to require an unreasonable amount of personal attention during the brewing cycle.

The needs of commercial establishments described above are of particular concern in regard to equipment for brewing tea. Most brewing equipment has been specifically designed for making coffee, which does not have the same brewing requirements as tea. For example, brewing tea usually requires a relatively lengthy period of "steeping" to extract the full flavor and bouquet from the tea leaves. Compared to the steeping time for tea, the time required to extract full coffee flavor from grounds is very small, and coffee brewers are designed to pass hot water through the grounds with very little delay. Also, in making the tea, the extract from the steeping operation may be too strong for regular consumption and must be diluted, whereas the extract from typical coffee brewers is ready for consumption immediately. Accordingly, many restaurants and commercial establishments have resorted to the use of instant tea, which does not have the full flavor or body of brewed tea, or tea bags which are relatively expensive and not convenient from the customer's standpoint.

Accordingly, it is a general object of the present invention to provide improved apparatus for brewing beverages.

It is a further object of the present invention to provide brewing apparatus for making relatively large quantities of beverages, which is easy to use, and requires only a small amount of personal attention.

It is another object of the present invention to provide such apparatus which is particularly useful for brewing tea in large, commercial quantities.

These and other objects of the present invention are set forth more clearly in the following detailed description of the preferred embodiments of the present invention shown in the attached drawings, of which:

Figure 3:
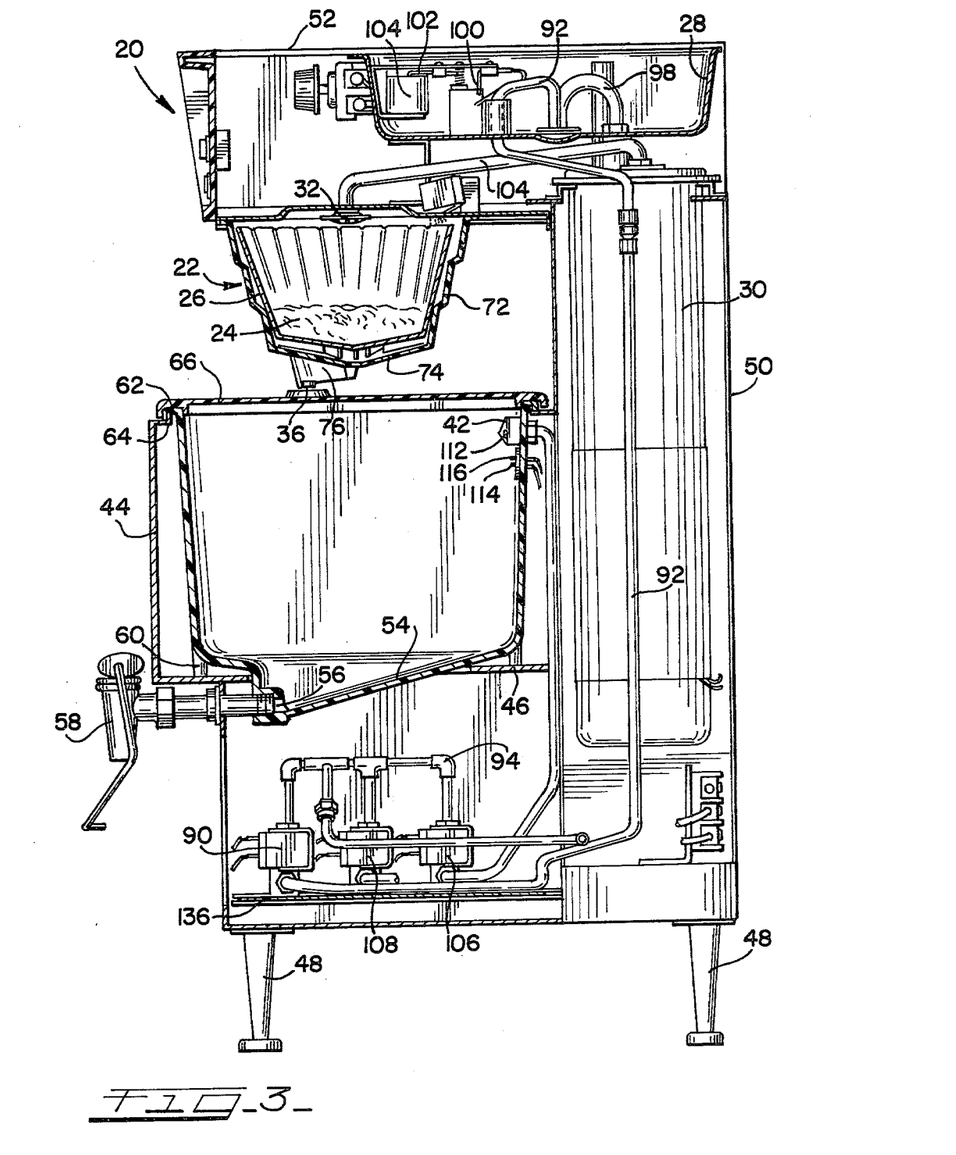
FIG. 3 is a vertical sectional view along line 3—3 of FIG. 1.

The present invention is generally embodied in beverage brewing apparatus 20 for making coffee, tea or similar beverages, as best seen in FIG. 3, by passing a measured amount of near-boiling water through a receptacle or funnel 22 which contains a quantity of dry beverage-making material, such as ground tea leaves 24 within a filter 26. The apparatus operates on a so-called "fill and dump" cycle, with an elevated cold water basin or tank 28 for collecting a selected amount of tap water. The tap water is drained by siphon action into a hot water tank 30 below the basin and displaces an equivalent amount of near boiling water which is discharged through a spray head 32 into the funnel 22.

Figures 4, 5:
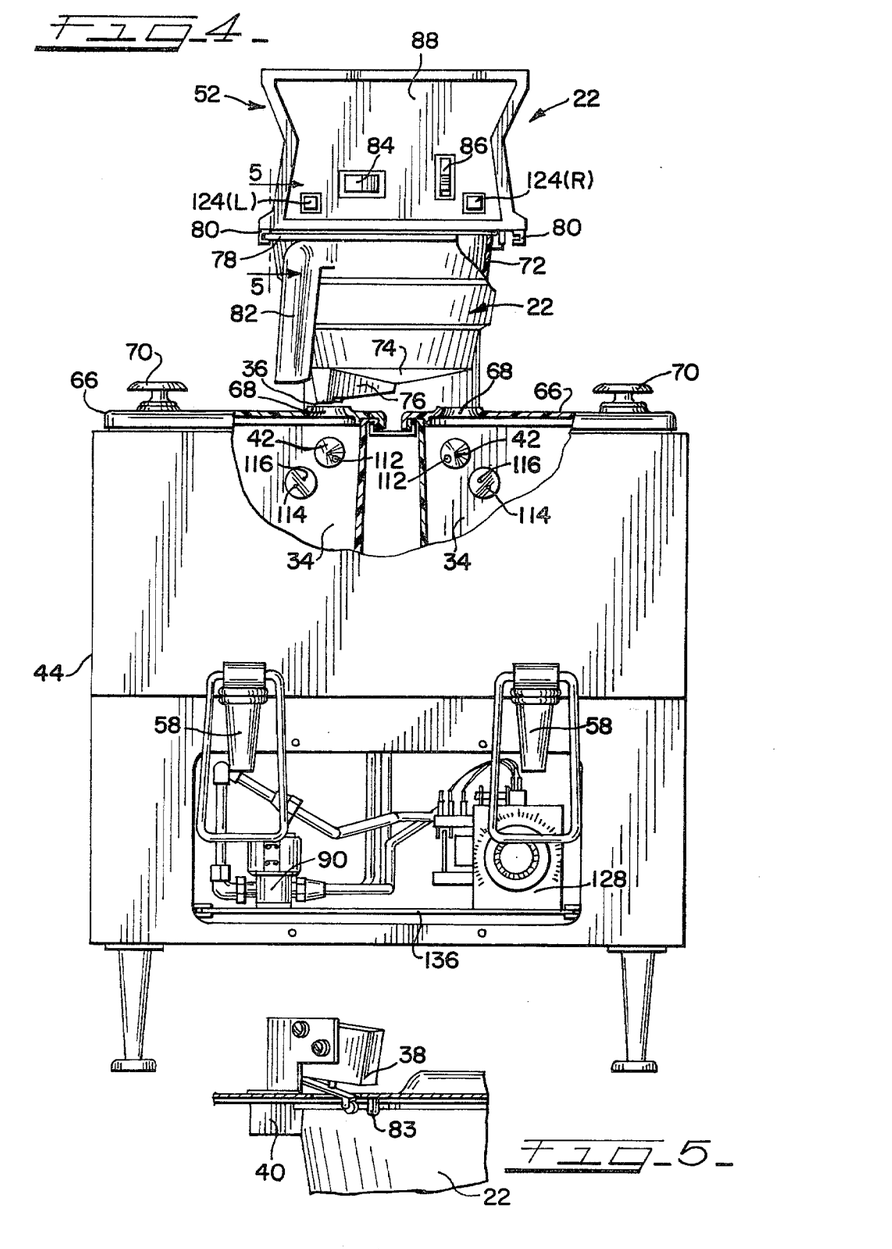
FIG. 4 is a front elevational view of the apparatus of FIG. 1, with portions removed to show additional aspects of the present invention.
FIG. 5 is an enlarged sectional view of a position switch on the beverage making apparatus of FIG. 1 cooperative with the dry beverage material funnel or reservoir.

In accordance with one aspect of the present invention, the brewing apparatus 20 is especially applicable and efficient for making large quantities of beverages, as may be needed, for example in restaurants or cafeterias. Referring to FIG. 4, the brewing apparatus 20 has a pair of large adjacent reservoirs 34 mounted below and on either side of spray head 32. The brewing funnel 22 is pivotally mounted on the apparatus and has an off-center discharge opening 36 which may be rotated to discharge into either of the reservoirs. This permits beverage to be dispensed from one reservoir at the same time that fresh beverage is being brewed in the other reservoir. As a safety feature, to prevent the brewing cycle from beginning unless the funnel 22 is properly positioned over one of the reservoirs 34, the control circuitry of the brewing apparatus includes a pair of angularly spaced contact switches 38 mounted to engage a tab 40 (FIG. 5) on the funnel 22 only when it is properly positioned over one of the reservoirs.

For brewing tea or other beverages which are steeped or otherwise produce a beverage concentrate which must be diluted before serving, each reservoir has a volume substantially larger than the selected volume of hot water passing through the funnel 22, and the apparatus includes completely automatic dilution means for adding tap water to each reservoir to dilute the concentrate to the proper strength. Preferably the dilution water is directed, via flow director 42, against the wall of the reservoir to reduce foaming and improve mixing, and is timed to begin after beverage concentrate begins flowing from the funnel 32 and to continue until after the flow of concentrate is substantially complete. Steeping of the beverage in the illustrated brewing apparatus is provided by making the discharge opening 36 of the funnel sufficiently small so that hot water flowing from spray head 32 accumulates in the funnel for the desired period of steeping.

Turning now to a more detailed description of the preferred embodiment of the present invention, the brewing apparatus 20 is generally of aluminum or stainless sheet metal construction for strength, weight savings and ease of cleaning. Although the specific shape of the housing may be changed for different aesthetic effect, the illustrated housing has a generally rectangular base portion 44 defining a hollow well or chamber which receives and encloses the reservoirs 34. As best seen in FIG. 3, the reservoirs rest on an interior horizontal partition plate 46 in the base portion which also serves to define a lower chamber in the base portion in which much of the electrical and fluid control system for the brewing apparatus is mounted. The base portion is mounted on legs 48 for sitting on a flat surface such as a countertop.

The housing further has a rear upstanding portion 50 which is carried by the base portion 44 and encloses the upright hot water tank 30, and an upper portion 52 which is cantilevered outwardly from the rear portion to overhang the reservoirs 34 and contains the cold water fill and dump basin 28.

Returning to the base portion 44 (FIGS. 3 and 4), the reservoirs 34 are preferably of generally rectangular shape, open at the top to receive beverage concentrate from the funnel 22. Bottom wall 54 of the reservoir slopes downwardly, through an opening in the horizontal partition plate 46, toward reservoir outlet 56 which is threadedly attached to the inlet pipe of a typical beverage dispensing head 58 mounted on the front panel of the base portion.

Although they may be made from other materials, each reservoir is preferably of one-piece molded plastic construction, with downwardly extending feet 60 for resting atop the partition plate 46 in the base portion. A downturned flange or ledge 62 is provided around the top edge of the reservoir to receive and rest on an upwardly extending flange 64 around the open well in the base portion, into which the reservoir is inserted.

To keep dust and the like from falling into the reservoirs, each has a remarkable plastic cover 66. Each cover has an opening 68 located to correspond to the proper positioning of the off-center discharge opening 36 of the funnel 22 for that particular reservoir, so that beverage concentrate may be discharged from the funnel into the reservoir while the cover is in place. Because the relative discharge positions for the funnel over each reservoir are not the same, the covers are not interchangeable, i.e., the opening 68 in a cover for one reservoir is not in the proper position to receive beverage concentrate if placed on the other reservoir. To prevent accidentally spilling very hot concentrated beverage because a cover is on the incorrect reservoir, each cover has a multi-purpose handle 70 which, in addition to providing means to grip the cover, are located so that in case a cover is placed on the wrong reservoir, the handle 70 will prevent the funnel 22 from being rotated into a position for discharge into that reservoir. As noted earlier, funnel position switches 38 connected to the brewer control circuit prevent the brewing cycle from starting unless the funnel is properly positioned. This may be better understood by referring to FIG. 4 and visualizing that the cover 66 on the right hand reservoir is placed on the left hand reservoir. The handle 70 would then be in a position where the opening 68 in the proper cover would normally be, and would abut the wall of the discharge opening 36 in the bottom of the funnel and prevent proper positioning to close switch 38. Although the multi-purpose handle works satisfactorily to prevent accidental spillage, the covers 66 could also employ other upstanding stops, in place of or in addition to the handles, to block rotation of the funnel over a reservoir which has the wrong cover.

The funnel 22 which is preferably employed with brewing apparatus 20 of the present invention is best shown in FIG. 4. It has a generally inclined, stepped side wall 72 which tapers inwardly to a bottom wall 74 that includes a radial channel 76 communicating with the off-center discharge opening 36. The upper end of the funnel is open to receive hot water from the spray head 37 and has a generally radially extending rim 78 for insertion between a pair of facing slotted members 80 on the underside of upper portion 52 of the brewing apparatus. The sliding receipt of the rim within the slots also permits the funnel to be rotated or pivoted between positions where the off-center discharge portion is located over one or the other of the reservoirs 34. Additional details of the construction of the funnel are set forth in co-pending U.S. Patent Application Ser. No. 075,601 filed Sept. 14, 1979, which is hereby incorporated by reference.

Figure 1:
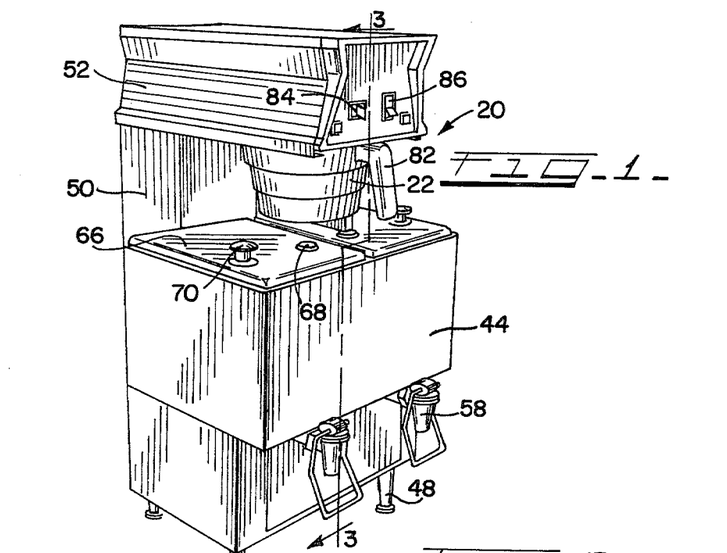
FIG. 1 is a perspective view of beverage brewing apparatus embodying the present invention.
Figure 2:
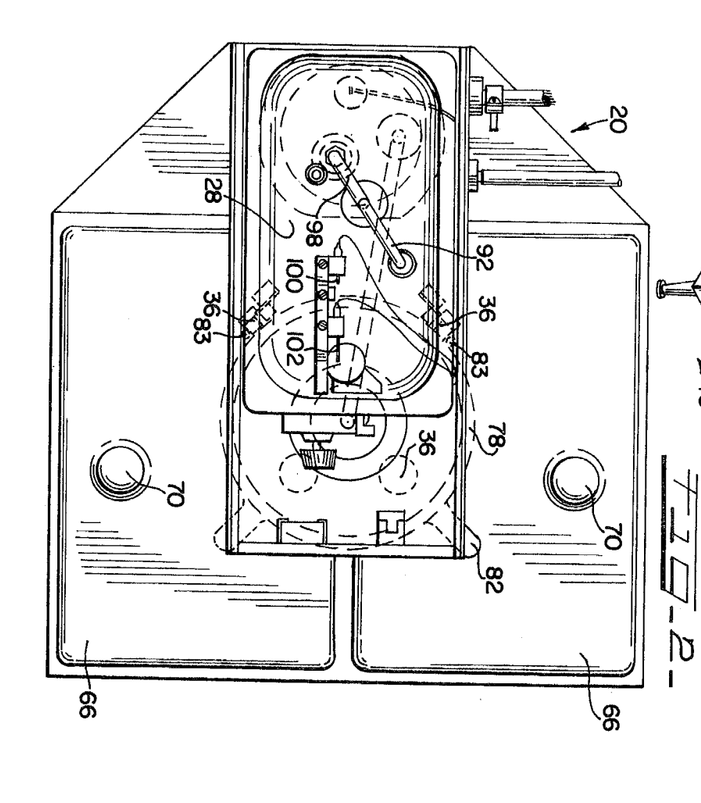
FIG. 2 is a top view of the apparatus of FIG. 1, with a top plate removed.

As noted earlier, the brewer includes a pair of switches 38 (FIGS. 2 and 5) to prevent operation of the brewing cycle unless the funnel 22 is properly positioned to discharge into one or the other of the reservoirs 34. The earlier mentioned tab 40 of the funnel extends generally radially outwardly from the rim 78, opposite funnel handle 82, and the switches 38 are spaced apart at different angular positions to engage the tab when the discharge opening 36 is properly positioned over one or the other of the reservoirs 34. Thus, the handle, which is located immediately outwardly of the funnel discharge opening 36 provides a visual indication of the proper positioning of the funnel and the tab in conjunction with the switches 38 provides a mechanical-electrical indication of proper positioning. Referring particularly to FIG. 5, the switches 38 are preferably mechanical, cam type switches and are mounted in the upper portion 52 of the housing, with roller cam actuators positioned for contact with the tab 40 when the funnel is properly positioned. Stop 83 adjacent the switch 38 prevents rotation of the funnel beyond the desired position. Detent means (not shown) may be provided in cooperation with the stop 83 to prevent "bounce back" of the funnel after it engages against the stop.

The first step in brewing a quantity of tea or the like is loading the funnel 22 with a measured quantity of material for the beverage to be brewed. For example, for tea, a quantity of ground leaves may be emptied into the paper filter 26 which lines the interior of the funnel, or the tea leaves may be prepackaged in a filter container or bag for loading into the funnel—this may even include placing a number of tea bags of the type currently available on the market into the funnel. The funnel is then inserted into the slots 80 on the upper portion of the housing and rotated to position the off-center discharge opening 36 over the selected reservoir. Proper manual positioning of the funnel 22 causes the funnel tab 40 to engage and close one of the cam-operated interlock switches 36 to permit the cycle to start. The operator then moves a selector switch 84 to the reservoir chosen and momentarily presses a start switch 86, both of which are mounted on a front panel 88 of the upper housing portion 52 (FIG. 4). By pressing the start switch, the operator energizes an electrical circuit which will be discussed more fully later, which automatically controls the flow of brewing and dilution water through the apparatus.

Figure 6:
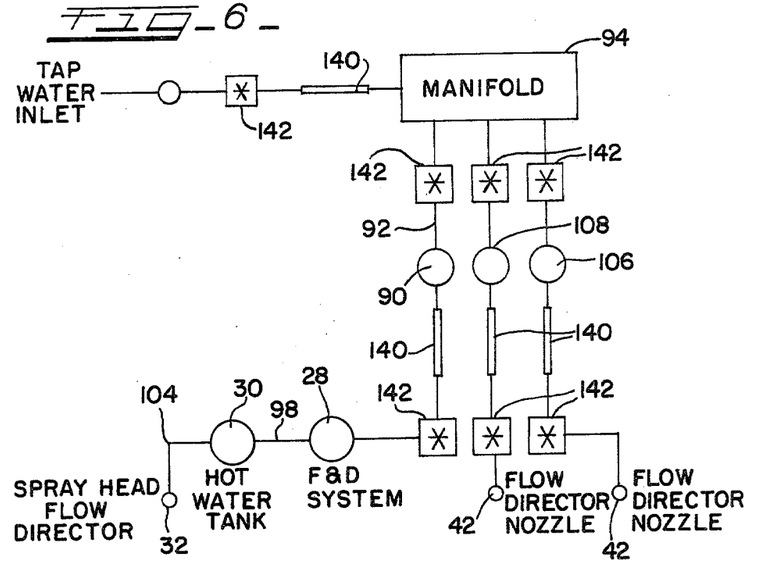
FIG. 6 is a schematic diagram of the fluid flow system embodied in the brewing apparatus of FIG. 1.

Referring to FIG. 6, which is a plumbing diagram for the brewer, and also to FIG. 3, the brewing cycle begins by the opening an electrical solenoid valve 90 in water line 92 which extends from an inlet water manifold 94 to the cold water basin or tank 28 in the upper portion 52 of the housing. The water line 92 extends upwardly through the bottom of the tank and then returns for discharge into a shallow well 96, adjacent to a siphon tube 98 which leads to the hot water tank 30 therebelow. As set forth in more detail in one or more of prior U.S. Pat. Nos. 3,593,605; 3,608,471; 3,691,932; 3,793,934 and 4,094,233, adjacent positioning of the outlet of water line 92 and the inlet of siphon tube 98 prevents siphoning into the hot water tank while cold water is entering the basin. The solenoid valve 90 remains open until water in the basin reaches a water level probe 100 which is located to correspond to a selected quantity of brewing water, typically less than or equal to about one-half (½) gallon. For brewing tea, with a reservoir 34 of about three (3) gallon capacity, the preferred quantity of brewing water is one-half (½) gallon. If water level probe 100 is inoperative, a second or back-up safety probe 102 in the basin prevents overflow. To prevent use of the apparatus when the main probe is inoperative, the safety probe 102 extends down into a small cup 104 which retains a supply of water in contact with the probe 102 to "fool" the control circuit of the brewing apparatus and prevent the starting of a new brewing cycle until repairs can be made.

When solenoid valve 90 closes and water stops entering the basin, hydraulic pressure starts a siphoning action within the siphon tube 98 which extends into the hot water tank 30, to near the bottom thereof. Substantially all the cold water in the basin 28 is drained by the siphoning action into the hot water tank, and displaces an equal amount of hot water which passes through outlet conduit 104 in the top of the hot water tank to the spray head 32 which is positioned over the funnel 22.

As noted earlier, to provide the steeping action necessary to extract the essential oils, flavors, body, bouquet and the like from the tea or other beverage product contained in the funnel, the spray head is sized to discharge the hot water into the funnel at a relatively rapid rate compared to the outlet opening 36 of the funnel which is relatively small so that hot water accumulates in the funnel. After a period of steeping, beverage concentrate resulting therefrom flows through the off-center discharge opening 36 of the funnel into the selected reservoir 34.

Because the concentrate is relatively strong and generally not suited for normal consumption, it must be diluted. Solenoid control valves 106 and 108 each control the flow of dilution water into one of the reservoirs 34. After concentrate has begun to flow from the funnel 22 into the reservoir 34, the solenoid control valve which controls dilution water for the reservoir chosen is opened to allow tap water to flow into the reservoir to dilute and cool the concentrate. Using the reservoir shown in FIG. 3 as an example, solenoid valve 106 opens to allow the flow of diluting water from the manifold 94 into fluid conduit 110 which extends to the flow director 42 mounted within the reservoir.

Referring to FIGS. 3 and 4, it may be seen that the outlet orifice 112 of the flow direction is positioned to discharge the diluting water against the sidewall of the reservoir in a fluid stream at an angle with respect to the sidewall of less than or equal to 45°, preferably about 10°, and at a relatively samll downward angle of about 22°. This reduces foaming of the beverage product within the reservoir and creates a swirling action which provides better mixing. The flow of dilution water continues until the beverage level in the reservoir reaches a liquid level probe 114, which, via electric control circuitry, de-energizes and closes the solenoid valve 106. As with the fill and dump basin, each reservoir has a safety probe 116 spaced slightly higher in the reservoir to stop the flow of diluting water if the primary probe 114 is disabled. The distance between the probes, however, is not sufficient to permit the beverage from being too diluted.

For thorough mixing of diluting water and beverage concentrate, the orifice 112 of the flow director 42 is sized so that dilution water is discharged into the reservoir at a rate which allows substantially all the beverage concentrate to flow from the funnel 22 before the liquid level probe 114 is reached. The quantity of dilution water may be varied to vary the strength of the beverage and depends on the location of the probe 114 and the size of the reservoir. For tea, using a three gallon reservoir, two and one-half gallons of water are preferably added to cool and dilute one-half gallon of hot tea concentrate to the preferred strength at about 100° F., which is suitable to adding to a glass of ice for iced tea. After the dilution step is complete, the beverage within the selected reservoir is ready for dispensing, and the used beverage-making material contained within the funnel may be discarded and the funnel reloaded and positioned to discharge into the other reservoir for repetition of this cycle.

Figure 8:
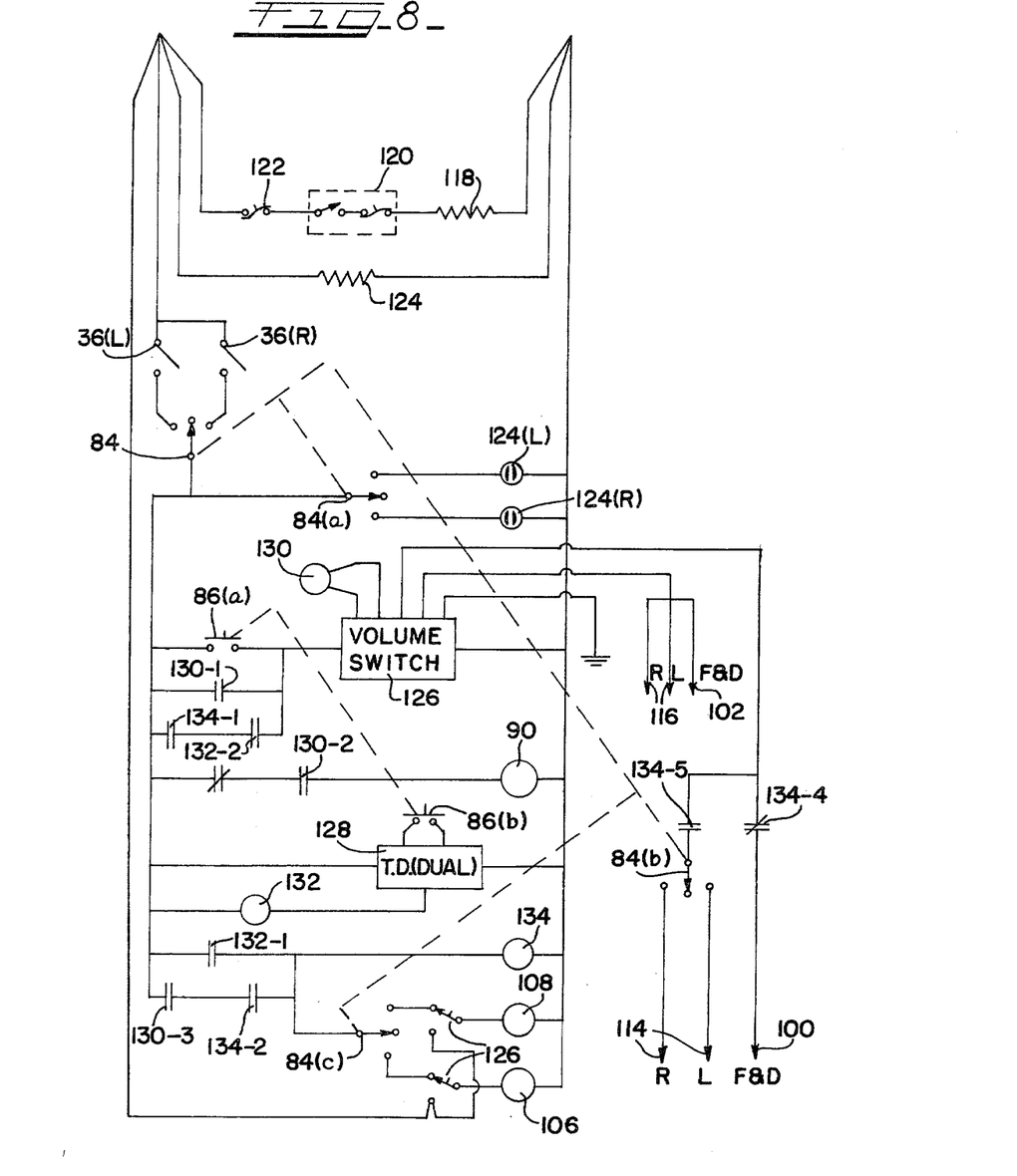
FIG. 8 is an electrical schematic of the control system for the brewing apparatus of FIG. 1.

The electrical control system for controlling the cycling of the brewing apparatus is best seen in FIG. 8. Except for manual loading of the funnel, the electrical control circuit in FIG. 8 provides for completely automatic operation of the brewing cycle. The circuit is adapted for connection to a 120 volt AC outlet, and provides continuous power to an internal heater 118 in the hot water tank, through a serially connected thermostat and switch combination 120 and overload cutout switch 122, and to an exterior blanket heater 124 on the tank to help maintain the water at the correct temperature.

Before energizing the remainder circuit by pressing the start switch 86, the operator first depresses the selector switch 84 to the right or left, depending on the reservoir which is to be filled. The selector switch 84 is in series with the cam switches 36, which have been indicated in the circuit diagram as 36(L) and 36(R) to correspond to the switches activated when the funnel is positioned over the left and right reservoirs respectively. These switches control the energizing of the remainder of the circuit, and thus the brewing cycle cannot start unless the funnel is properly positioned over one of the reservoirs and the selector switch 84 has been moved to close the circuit for that particular reservoir. As shown by the dashed lines in FIG. 8, the positioning of the selector switch also has three other aspects, in addition to the interlock with the cam switches 36. The selector switch also, at 84(a), closes a circuit to one of indicator lights 124(L) and 124(R), corresponding to the reservoir selected (See FIG. 4 for position of indicator lights on front panel 88). At 84(b), the selector switch activates the particular water level probe 114 for the reservoir chosen, and, at 84(c), the selector connects into the circuit whichever of the dilution water control solenoids 106 or 108 that controls the flow of water to the selected reservoir.

The brewing cycle is actually started by momentarily depressing the start switch 86, which, at 86(a) closes the circuit to energize volume switch 126 and, at 86(b), closes the circuit to energize a dual stage timer 128. Both the volume switch and timer are standard electrical devices available from various manufacturers. When the circuit is closed, the volume switch 126 energizes relay 130 (24 volt DC 3PST). This closes the normally open relay contacts 130-1 in parallel with the starter switch 86 and serves to keep the circuit closed and the volume switch energized after the starter switch is released. Contacts 130-2, in series with the water into solenoid valve 90, also close to energize the valve 90 and permit tap water to flow upwardly into the elevated cold water basin 28. Water is allowed to flow into the basin until it contacts liquid level probe 100 in the fluid reservoir, which probe is connected to the volume switch 126 to de-energize the switch and the associated relay 130 when the selected water level is reached. De-energizing the relay 130 results in opening the contacts 130-2, which de-energizes the normally closed solenoid valve 90 to stop the flow of water into the basin. This normally takes place in about 35 seconds from when the start switch is pressed to fill the basin with about ½ gallon of water. Should the primary probe 100 in the basin fail, the safety probe 102 is connected directly to the volume switch to de-energize it if water reaches the safety probe.

When the basin is filled, except for the appropriate indicator light 124(L) or 124(R), the fluid control circuit, is at this point, deactivated. During the period of deactivation, the cold water from the basin is siphoned into the hot water tank, displacing a corresponding quantity of hot water which is discharged quickly into the funnel 22 to permit the tea to steep. After a selected period of time for the steeping action to take place and for the liquid concentrate to begin draining into the reservoir, preferably about 8 minutes which is set on timer 128, the timer pulses on for about ¾ seconds to start the dilution portion of the brewing cycle. During this ¾ second, the timer energizes relay 132 (120V AC DPST) closing its contacts 132-1 in a parallel circuit to simultaneously energize relay 134 (120V AC 3PDT). This causes the circuit to the volume switch 126 to be closed via contacts 134-1 and 132-2 which are parallel to the starter switch. As before, energizing the volume switch 126 closes relay 130. This results in closing the contacts 130-3 and 134-2 of the relays 130 and 134 which are in series with the selector swtich 84(c) and the particular solenoid valve 106 or 108 which controls the flow of dilution water to the selected reservoir. Dilution water is thus permitted to flow into the reservoir in which beverage concentrate is being collected.

Relays 130 and 134 remain energized, allowing dilution water to flow, even after the timer turns off, due to contacts 130-1 which, as described earlier, bypasses the starter switch 86(a) to keep the volume switch energized, and contacts 130-3 and 134-2 which also bypass relay contacts 132-1 to close the circuit to the relay 134 as well as the particular dilution control solenoid. It should be noted that even though the volume switch 126 and relay 130 are energized here as during the earlier fill and dump portion of the brewing cycle, solenoid valve 90 remains closed because normally closed contacts 134-3 in series with the valve are open so long as the relay 134 is energized.

Relay 134, which is energized only during the dilution portion of the brewing cycle has one other aspect, it couples the appropriate water level probe to the volume switch 126 for stopping flow when the probe is grounded by water contact. When not energized, during the fill and dump portion, normally closed relay contacts 134-4 connect the primary probe 100 in the elevated cold water basin 28 to the volume switch. When energized, the contacts 134-4 open, and the normally open contacts 134-5 in series with both the reservoir water level probes 114 close to connect the selected one of them directly to the volume switch.

Returning to the brewing cycle, the timer pulse into the "on" position results in opening of the solenoid valve controlling the flow of water into the selected reservoir 34. When the water level reaches the water level probe 114 for that reservoir, it de-energizes the volume switch 126 resulting in de-energizing of the relays 130 and 134 and closing of the dilution water solenoid valve. Should the probe 114 fail, safety probe 116 is directly connected to the volume switch to stop the flow of dilution water when it reaches the safety probe.

At this time, the brewing cycle is complete, and all relays and systems are in their original state, ready for a repeat of the brewing cycle for the other reservoir. The total brewing time between depression of the start switch 86 and shutoff of the diluting water is approximately 10.5 minutes.

Figure 9:
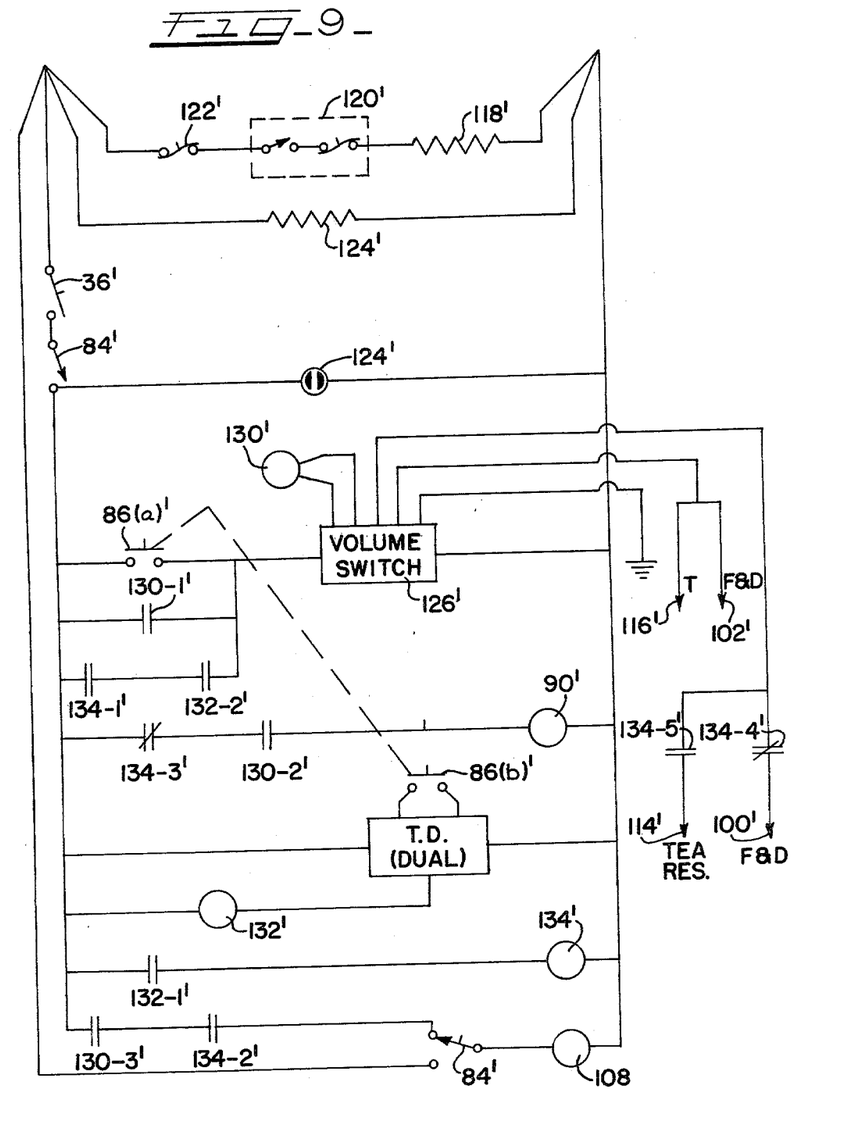
FIG. 9 is an electrical schematic of the control system for an alternative version of the brewing apparatus of FIG. 1 embodying the present invention.

Brewing apparatus embodying the present invention may also be made with only a single reservoir. The fluid flow diagram and electric schematic for this version of the present invention is set forth in FIGS. 7 and 9, respectively. The operation of a single reservoir brewer is substantially the same as that described above and the elements in FIGS. 7 and 9 have been indicated by corresponding prime numbers. Just as with the dual reservoir brewer, the single reservoir has a funnel position switch 36' in series with the on-off selector switch 84'. Engagement of the selector switch energizes an indicator light 124'—probe and solenoid valve selection is not needed for a single reservoir brewer. The start switch 86', as in the earlier disclosed model begins the brewing cycle by energizing a volume switch 126' and dual stage timer 128' which, in the same sequence described above operate to energize the various solenoids 90' and 106' to start the fill and dump portion of the cycle and after a period of steeping action, to initiate a diluting water cycle as described above.

Although both single and dual reservoir brewers are intended for automatic operation, manual override are provided to permit beverage to be brewed in the event of malfunction or power outage. Assuming the water in the hot water tank 30 remains at a sufficiently high temperature for brewing, the upper portion of the brewing apparatus has a removable top wall above the cold water basin. The operator measures a selected amount of fluid, 76 ounces for a tea brewer of the size described above, and pours it directly into the cold water basin. This, as with the automatic cycle, is siphoned into the hot water tank by hydraulic pressure, and an equal amount of hot water is dispensed into the funnel through the dispensing head. The solenoid controlling diluting water to the particular reservoir may then be energized by a manual switch 136 positioned in an out-of-the way location on the brewer. If there is total failure of the electrical system, diluting water may be manually added to the reservoir.

Figure 7:
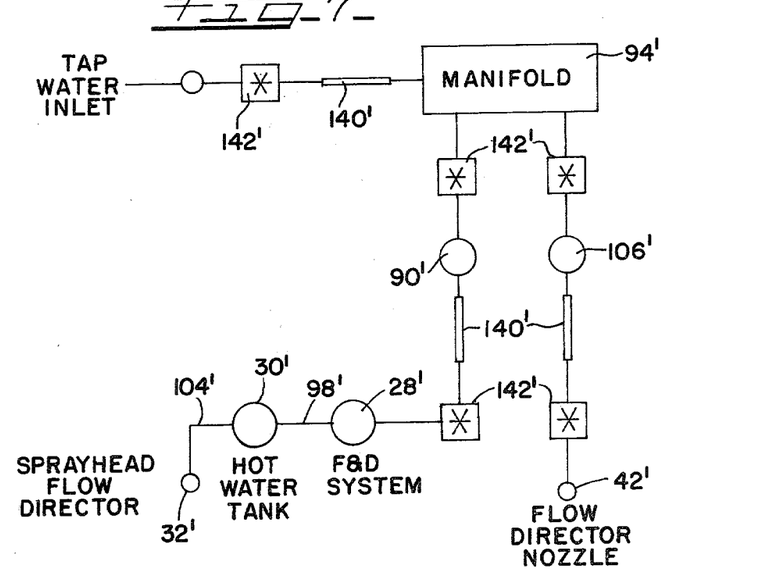
FIG. 7 is a schematic diagram of a fluid flow system embodied in an alternative version of the brewing apparatus of FIG. 1 embodying the present invention.

For ease of access and servicing, much of the flow control and electric circuitry, including the solenoid valves 90, 106, 108 and the timer 128 are mounted (FIG. 4) on a removable platform or support plate 138 for access through a removable portion of the front panel. As seen in FIGS. 6 and 7, a portion 140 of the water lines from the solenoids may be flexible or have quick-removal couplings for withdrawing the support plate and fluid and electric circuitry as a unit. The fluid flow systems set forth in FIGS. 6 and 7 also may be modified for the addition of various elements 142, e.g., flow traps or the like, as may be required by local codes.

This, it may be seen that the present invention provides a unique brewing apparatus particularly useful in commercial institutions for brewing large quantities of tea or similar beverages. Although it has been described in terms of the preferred and selected alternative embodiments, it is intended to include within the scope of this invention, as set forth in the following claims, those equivalent structures and features, some of which may be apparent upon reading this description, and others of which may be understood only after some study.

What is claimed is:

1. In beverage brewing apparatus comprising housing means including a base portion and an upper portion carried by and above said base portion, cold water conduit means, a cold water fill basin in said upper portion to receive a selected quantity of cold water from said cold water conduit means, a hot water tank below said cold water tank, means communicating between the cold water basin and hot water tank to conduct said selected quantity of cold water to said hot water tank and to displace therefrom a corresponding quantity of hot water to a hot water dispensing port, and a dry beverage-making material receptacle carried by said upper portion beneath said dispensing port, the improvement comprising a pair of reservoirs carried by said base portion below and substantially on either side of said hot water dispensing port, said receptacle comprising on off-center liquid outlet and being pivotally mounted on said upper portion to permit the receptacle to be pivoted to position said outlet over either of said reservoirs to gravitationally discharge liquid beverage extract through said outlet into selected one of said reservoirs.

2. Beverage brewing apparatus in accordance with claim 1 further comprising control means for controlling the brewing cycle of said apparatus, said control means including sensor means to detect the proper positioning of said receptacle over one or the other of said reservoirs.

3. Beverage brewing apparatus in accordance with claim 2 wherein said sensor means comprise a pair of angularly spaced sensors, said receptacle including a tab portion of engaging one of said sensors when said receptacle is properly positioned over one of said reservoirs.

4. Beverage brewing apparatus in accordance with claim 2, further comprising a non-interchangeable removable cover over each of said reservoirs, each of said covers including opening means disposed within the cover to permit liquid to discharge from the receptacle into the reservoir, each of said covers further comprising upstanding stop means to block the receptacle from proper positioning over a reservoir which is covered by the cover associated with the other of said reservoirs.

5. Beverage brewing apparatus in accordance with claim 1 wherein aid receptacle includes an annular rim, and said upper portion of said housing includes a pair of spaced slots to slidably and pivotally receive said receptacle.

6. Beverage brewing apparatus in accordance with claim 5 wherein said receptacle comprises a radially extending tab portion, said apparatus further comprising a pair of spaced switch actuator elements, one of which is engageable by said tab when said receptacle is properly positioned over one of said reservoirs.

7. Beverage brewing apparatus in accordance with claim 6 further comprising a stop, carried by upper portion adjacent each of said switch actuators to engage said tab to prevent pivoting of said receptacle beyond said switch actuators.

8. Beverage brewing apparatus in accordance with claim 1 wherein each of said receptacles is of substantially greater volume than said selected quantity of water, and said apparatus further comprises dilution means to add selected quantities of water to each reservoir to dilute the beverage liquid received from the receptacle.

9. Beverage brewing apparatus in accordance with claim 8 wherein said dilution means is timed to add dilution water after beverage liquid is received within said reservoir from the receptacle and to continue the addition of diluting water until after substantially all of the selected quantity of water has flowed through the receptacle.

10. Beverage brewing apparatus in accordance with claim 8 wherein said dilution means comprises means for directing the flow of dilution water against the side of each of said reservoirs.

11. Beverage brewing apparatus in accordance with claim 10 wherein said directing means comprises means for discharging water at an angle of less than or equal to 45° with respect to the wall of each reservoir.

12. Beverage brewing apparatus in accordance with claim 8 further comprising automatic flow control means operatively associated with said cold water conduit means to control the flow of said selected quantity of cold water and operatively associated with said dilution means to control the addition of dilution water, said control means including timer means to open said cold water conduit means to discharge a selected quantity of cold water into said cold water basin before the addition of dilution water to the selected one of said reservoirs.

13. Beverage making apparatus in accordance with claim 12 wherein said timing means continues the addition of dilution water until after substantially all of said selected quantity of water is received from said reservoir.

14. Beverage making apparatus in accordance with claim 12 wherein said control means further comprises manual override means to activate said control means manually to add dilution water to said reservoir.

15. Beverage making apparatus in accordance with claim 12 further comprising water level detector means carried by each of said reservoirs to detect when the liquid level therein reaches a selected level, said control means being responsive to said water level detector menas to stop the addition of dilution water when said selected level is reached.

16. Beverage making apparatus in accordance with claim 15 further comprising a second liquid level detector carried by said reservoir for detecting liquid at a second level slightly higher than said selected level, said control means being responsive to said second level detector to stop the flow of dilution water if liquid reaches said second level.

17. Beverage brewing apparatus in accordance with claim 12 further comprising valve means associated with said cold water conduit means to control flow of the selected quantity of water and valve means associated with said dilution means to control flow of dilution water, said control means comprising switching means and associated timing means, said cold water basin and each of said reservoirs including a liquid level detector; said switching means being adapted upon initial energizing to open said cold water conduit valve to permit the flow of water into said cold water basin and to energize said timing means, said liquid level detector in said basin being operatively associated with said switch to de-energize said switch when said selected quantity of water has been received into said cold water tank, said timer means being timed to re-energize said switch a selected period of time after said de-energizing, said switch being disposed when re-energized to open said dilution water valve, said reservoir level detector being associated with said switch to open said master switch when liquid in said reservoir reaches a selected level.

18. Beverage brewing apparatus comprising:
a housing including means for supporting a brewing receptacle adapted to contain a quantity of dry beverage-making material;
means carried by said housing for conducting a selected quantity of water through the receptacle to make a liquid beverage concentrate;
a reservoir, including dispensing means, carried by said housing and disposed to receive beverage concentrate from the aforesaid receptacle, said reservoir having a volume substantially greater than said selected amount of water making the beverage concentrate;
dilution means in communication with said reservoir for adding water to dilute the beverage concentrate to provide a beverage product for dispensing; and
automatic flow control means operatively associated with said means for conducting a selected quantity of water to control the flow of said selected quantity of water and operatively associated with said dilution means to control the addition of dilution water, said control means including timer means to start the addition of dilution water after the making of said beverage concentrate has started.

19. Beverage brewing apparatus in accordance with claim 18 wherein said timer means continues the addition of dilution water until after substantially all of said beverage concentrate is received in said reservoir.

20. Beverage brewing apparatus in accordance with claim 18 wherein said control means further comprises manual override means to permit manual activation of said control means to add dilution water to said reservoir.

21. Beverage brewing apparatus in accordance with claim 18 further comprising liquid level detector means carried by said reservoir to detect when beverage therein reaches a selected level, said control means being responsive to said water level detector means to stop the addition of dilution water when said selected level is reached.

22. Beverage brewing apparatus in accordance with claim 21 comprising a second liquid level detector carried by said reservoir for detecting liquid at a second level slightly higher than said selected level, said control means being responsive to said second level detector to stop the flow of dilution water if liquid reaches said second level.

23. Beverage brewing apparatus in accordance with claim 18 wherein said dilution means includes means for directing the flow of diluting water against the wall of each of said reservoirs to reduce foaming and provide better mixing of the dilution water and concentrate.

24. Beverage brewing apparatus in accordance with claim 23 wherein said directing means is disposed to direct dilution water against a sidewall of said reservoir at an angle of less than or equal to 45°.

25. Beverage brewing apparatus comprising a housing including means for supporting a brewing receptacle having an off-center discharge port and being adapted to contain a quantity of dry beverage-making material;
means carried by said housing for conducting a selected quantity of water through the receptacle to make a liquid beverage concentrate; and
a pair of adjacent reservoirs, including dispensing means, carried by said housing below said support means and disposed to receive beverage concentrate by gravitational discharge from the aforesaid receptacle, said support means for the receptacle permitting rotation of the receptacle so that the receptacle may be pivoted for discharge into selected one of said reservoirs,
each of said reservoirs having a volume substantially greater than said selected amount of water provided by the beverage concentrate, and said apparatus further comprising dilution means in communication with each of said reservoirs for adding water thereto to dilute the beverage concentrate to provide a beverage product for dispensing.

26. Beverage brewing apparatus in accordance with claim 25 further comprising sensor means to sense the position of the receptacle supported by said housing.

27. Beverage brewing apparatus in accordance with claim 25 wherein said sensor means comprises a pair of spaced position detectors operable to detect when the receptacle is properly positioned over one or the other of said reservoirs.

28. Beverage brewing apparatus in accordance with claim 25 further comprising a non-interchangeable removable cover on each of said reservoirs with opening means therein for receiving concentrate from the receptacle, each of said covers including stop means disposed to prevent the receptacle from being positioned over a reservoir which is covered by the incorrect one of said covers.

29. Beverage brewing apparatus in accordance with claim 25 wherein said dilution means includes means for directing the flow of diluting water against the wall of each of said reservoirs to reduce foaming and provide better mixing of the dilution water and concentrate.

30. Beverage brewing apparatus in accordance with claim 29 wherein said directing means is disposed to direct dilution water against a sidewall of said reservoir at an angle of less than or equal to 45°.

31. Beverage brewing apparatus in accordance with claim 25 further comprising a liquid level detector associated with each of said reservoirs to detect when liquid in the reservoir reaches a selected level, and flow control means responsive to said beverage level detector to stop the flow of dilution water when the selected level is reached.

32. Beverage brewing apparatus in accordance with claim 25 wherein said dilution means is adapted to continue the addition of dilution water until after substantially all of said beverage concentrate is received in said reservoir.

33. Beverage brewing apparatus in accordance with claim 25 further comprising automatic flow control means operatively associated with said means for conducting a selected quantity of water to control the flow of said selected quantity of water and operatively associated with said dilution means to control the addition of dilution water, said control means including timer means to start the addition of dilution water after the flow of said selected quantity of water has begun.

34. Beverage brewing apparatus in accordance with claim 33 wherein said timer means continues the addition of dilution water until after substantially all of said beverage concentrate is received in said reservoir.

35. Beverage brewing apparatus in accordance with claim 33 wherein said control means further comprises a manual override means to permit manual activation of said control means to add dilution water to said reservoir.

36. Beverage brewing apparatus in accordance with claim 33 further comprising water level detector means carried by said reservoir to detect when beverage therein reaches a selected level, said control means being responsive to said level detector means to stop the addition of dilution water when said selected level is reached.

37. Beverage brewing apparatus in accordance with claim 36 comprising a second liquid level detector carried by said reservoir for detecting liquid at a second level slightly higher than said selected level, said control means being responsive to said second level detector to stop the flow of dilution water if liquid reaches said second level.

38. Beverage brewing apparatus comprising a housing including means for supporting a brewing receptacle adapted to contain a quantity of dry beverage-making material;
    means carried by said housing for conducting a selected quantity of water through the receptacle to make a liquid beverage concentrate; and
    a pair of adjacent reservoirs, including dispensing means, carried by said housing and disposed to receive beverage concentrate from the aforesaid receptacle, each of said reservoirs having a volume substantially greater than said selected amount of water provided by the beverage concentrate;
    dilution means in communication with each of said reservoirs for adding water thereto to dilute the beverage concentrate to provide a beverage product for dispensing; and
    automatic flow control means operatively associated with said means for conducting a selected quantity of water to control the flow of said selected quantity of water and operatively associated with said dilution means to control the addition of dilution water, said control means including timer means to start the addition of dilution water after the flow of said selected quantity of water has begun.

39. Beverage brewing apparatus in accordance with claim 38 wherein said timer means continues the addition of dilution water until after substantially all of said beverage concentrate is received in said reservoir.

40. Beverage brewing apparatus in accordance with claim 38 wherein said control means further comprises manual override means to permit manual activation of said control means to add dilution water to said reservoir.

41. Beverage brewing apparatus in accordance with claim 38 wherein said receptacle has an off-center discharge port, said support means for the receptacle permitting rotation of the receptacle so that the receptacle may be pivoted for discharge into selected one of said reservoirs and further comprising a non-interchangeable removable cover on each of said reservoirs with opening means therein for receiving concentrate from the receptacle, each of said covers including stop means disposed to prevent the receptacle from being positioned over a reservoir which is covered by the incorrect one of said covers.

42. Beverage brewing apparatus in accordance with claim 38 wherein the receptacle has an off-center discharge port, said support means for the receptacle permitting pivoting thereof for discharge into selected of said reservoirs, and said apparatus further comprising a pair of spaced position detectors operable to detect when the receptacle is properly positioned over one or the other of said reservoirs.

43. Beverage brewing apparatus in accordance with claim 38 wherein said dilution means includes means for directing the flow of diluting water against the wall of each of said reservoirs to reduce foaming and provide better mixing of the dilution water and concentrate.

44. Beverage brewing apparatus in accordance with claim 43 wherein said directing means is disposed to direct dilution water against a sidewall of said reservoir at an angle of less than or equal to 45°.

45. Beverage brewing apparatus in accordance with claim 38 further comprising a beverage level detector associated with each of said reservoirs to detect when liquid in the reservoir reaches a selected level, and flow control means responsive to said beverage level detector to stop the flow of dilution water when the selected level is reached.

46. Beverage brewing apparatus in accordance with claim 45 comprising a second liquid level detector carried by said reservoir for detecting liquid at a second level slightly higher than said selected level, said control means being responsive to said second level detector to stop the flow of dilution water if liquid reaches said second level.

47. Beverage brewing apparatus comprising a housing including means for supporting a brewing receptacle having an off-center discharge port and adapted to contain a quantity of dry beverage-making material;
    means carried by said housing for conducting a selected quantity of water through the receptacle to make a liquid beverage concentrate; and
    a pair of adjacent reservoirs, including dispensing means, carried by said housing and disposed to receive beverage concentrate from the aforesaid receptacle, each of said reservoirs having a volume substantially greater than said selected amount of water provided by the beverage concentrate, said apparatus further comprising dilution means in communication with each of said reservoirs for adding water thereto to dilute the beverage concentrate to provide a beverage product for dispensing;
    said support means for the receptacle permitting rotation of the receptacle so that the receptacle may be pivoted for gravitational discharge into selected one of the adjacent reservoirs; and a non-interchangeable removable cover on each of said reservoirs with opening means therein for receiving concentrate from the receptacle, each of said covers including stop means disposed to prevent the receptacle from being positioned over a reservoir which is covered by the incorrect one of said covers.

48. Beverage brewing apparatus in accordance with claim 47 further comprising sensor means to sense the position of the receptacle supported by said housing.

49. Beverage brewing apparatus in accordance with claim 48 wherein said sensor means comprises a pair of spaced position detectors operable to detect when the receptacle is properly supported over one or the other of said reservoirs.

50. Beverage brewing apparatus in accordance with claim 47 wherein said dilution means includes means for directing the flow of diluting water against the wall of each of said reservoirs to reduce foaming and provide better mixing of the dilution water and concentrate.

51. Beverage brewing apparatus in accordance with claim 50 wherein said directing means is disposed to direct dilution water against a sidewall of said reservoir at an angle of less than or equal to 45°.

52. Beverage brewing apparatus in accordance with claim 47 further comprising a liquid level detector associated with each of said reservoirs to detect when liquid in the reservoir reaches a selected level, and flow control means responsive to said beverage level detector to stop the flow of dilution water when the selected level is reached.

53. Beverage brewing apparatus in accordance with claim 52 comprising a second liquid level detector carried by said reservoir for detecting liquid at a second level slightly higher than said selected level detector to stop the flow of dilution water if liquid reaches said second level.

54. Beverage brewing apparatus in accordance with claim 47 further comprising automatic flow control means operatively associated with said means for conducting a selected quantity of water to control the flow of said selected quantity of water and operatively associated with said dilution means to control the addition of dilution water, said control means including timer means to start the addition of dilution water after the flow of said selected quantity of water has begun.

55. Beverage brewing apparatus in accordance with claim 54 wherein said control means further comprises manual override means to permit manual activation of said control means to add dilution water to said reservoir.

56. Beverage brewing apparatus in accordance with claim 54 wherein said timer means continues the addition of dilution water until after substantially all of said beverage concentrate is received in said reservoir.

* * * * *